United States Patent [19]

Botros

[11] 4,118,383
[45] Oct. 3, 1978

[54] AZO DYES CONTAINING AN N-2-PYRIDINE-2,4-DIHYDROXYBENZAMIDE COUPLER COMPONENT

[75] Inventor: Raouf Botros, Beech Creek, Pa.

[73] Assignee: American Color & Chemical Corporation, Charlotte, N.C.

[21] Appl. No.: 692,933

[22] Filed: Jun. 4, 1976

[51] Int. Cl.² ............... C09B 29/22; C09B 29/36
[52] U.S. Cl. .................. 260/156; 260/146 R; 260/295 AM; 8/41 D; 8/42 D
[58] Field of Search ............... 260/156, 146 R

[56] References Cited

U.S. PATENT DOCUMENTS

| 2,128,256 | 8/1938 | Krzikalla et al. | 260/156 X |
| 2,365,265 | 12/1944 | Gross | 260/156 |
| 3,617,179 | 11/1971 | Lewis | 8/42 D |

FOREIGN PATENT DOCUMENTS 910,111  11/1962  Great Britain ............ 260/146 R

Primary Examiner—Charles F. Warren
Attorney, Agent, or Firm—Armstrong, Nikaido, Marmelstein & Kubovcik

[57] ABSTRACT

Azo compounds of the formula

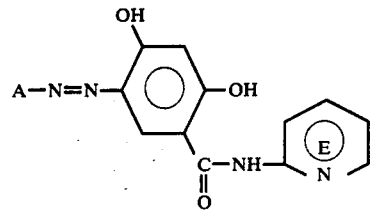

are provided where A is a diazotiable aromatic hydrocarbon. In particular, A is an optionally substituted benzene or naphthalene nucleus and E is an optionally substituted pyridine nucleus. The compounds provide dyeings on synthetic fibers with excellent dyeing and fastness properties.

11 Claims, No Drawings

4,118,383

AZO DYES CONTAINING AN N-2-PYRIDINE-2,4-DIHYDROXYBENZAMIDE COUPLER COMPONENT

BACKGROUND OF THE INVENTION

1. Field of the Invention

The present invention relates to azo dyes useful in the dyeing of synthetic fibers, particularly aromatic polyester and metallized polypropylene fibers. More particularly, the invention relates to azo dyes prepared from, as a coupling component, the condensation product of 2,4-dihydroxybenzoic acid and 2-aminopyridine.

2. Description of the Prior Art

Among polyester fibers, those based on polyethylene terephthalate continue to be the most important, although fibers based on 1,4-dimethylenecyclohexane terephthalate have become commercially available. Developments in both homo- and copolyesters have continued and many modified versions of polyethylene terephthalate have recently appeared on the market. With the advent of new fibers, the search is continuing for dyes which build up on the various types of polyester fabric proportionate to the amount of dye applied, and which are characteristized by good light and excellent sublimation properties.

Additionally, there is a need for dyes which will provide dyeings of good fastness properties on other synthetic fibers such as cellulose acetate, nylon and metal-modified, or metal-containing, polypropylene. Dyes for metallized polypropylene are becoming of particular importance in view of the increasing use of these fibers in carpeting.

Azo dyes, generally, are known for use in the dyeing of synthetic fibers. Azo dyes which possess hydroxy groups, however, although often having good sublimation fastness properties on polyester, frequently show a bathochromic coloration on nylon. Thus, for example, the dye of the formula

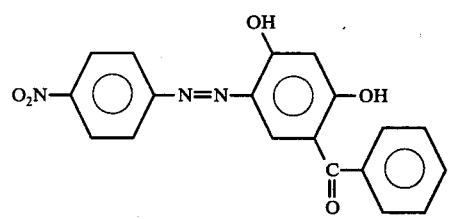

shows good sublimation fastness on polyester, but is not of strong commercial importance because the slight mark-off onto nylon in the standard sublimation test is redder in shade than the dyed polyester, as is the nylon stain in the standard wash fastness test.

Accordingly, it is an object of the present invention to provide azo compounds and dyes which do not exhibit the bathochromic coloration phenomenon when used to dye polyester and which provide dyeings on synthetic fibers, particularly polyester and metallized polypropylene, having good dyeing and fastness properties.

This and other objects will be apparent from the following summary and description of preferred embodiments.

SUMMARY OF THE INVENTION

According to the present invention there are provided azo compounds of the formula (I)

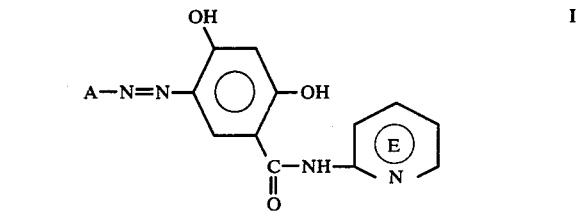

wherein

A is a benzene or naphthalene nucleus which is unsubstituted or substituted with any of alkyl of 1–4 carbons; alkoxy of 1–4 carbons; nitro; cyano; halogen; trifluoromethyl; hydroxy; acyloxy; carboxy; carbalkoxy; acyl; benzoyl; acylamide; benzamido; or carbamyl, the nitrogen being unsubstituted or singly or doubly substituted with alkyl of 1–4 carbons; and E is a 2-aminopyridine nucleus which is unsubstituted or substituted with any of alkyl of 1–4 carbons; alkoxy of 1–4 carbons; nitro or halogen.

The compounds of the formula (I) when suitably dispersed dye polyester fiber in strong bright orange to red hues of excellent buildup and which show excellent fastness properties. Excellent dyeings are also provided on metal-containing polypropylene fabrics particularly with dyes of the formula (I) where A is substituted with alkyl, alkoxy, halogen, trifluoromethyl or carbalkoxy groups.

According to another embodiment of the invention there is provided polyester textile material, i.e., aromatic polyester textile material, dyed with a compound of the general formula (I).

DETAILED DESCRIPTION

In the azo compounds of the general formula (I), A is a benzene or naphthalene nucleus derived from a diazotizable aromatic amine; the benzene nucleus being unsubstituted or substituted with up to three substituents and the naphthalene nucleus being unsubstituted or substituted with up to two substituents. The substituents are independently selected from alkyl of 1–4 carbons; alkoxy of 1–4 carbons; nitro; cyano; fluorine; chlorine; bromine; trifluoromethyl; hydroxy; acyloxy (RCOO—, where R is alkyl of 1–4 carbons); carboxy; carbalkoxy (ROOC—, where R is alkyl of 1–4 carbons); acyl (RCO—, where R is alkyl of 1–4 carbons); benzoyl; acylamide (RCONH—, where R is alkyl of 1–4 carbons); benzamido (ArCONH—, where Ar is phenyl) and carbamyl ($H_2N$—CO—), the nitrogen of which is unsubstituted or singly or doubly substituted with alkyl of 1–4 carbons.

E of the general formula (I) is a 2-aminopyridine nucleus which is unsubstituted or substituted with up to two substituents independently selected from alkyl of 1–4 carbons; alkoxy of 1–4 carbons; nitro; chlorine and bromine.

As used herein alkyl is intended to designate straight or branched chain alkyl of from 1 to about 4 carbons. Although it is believed that alkyl of up to 6 or 7 carbon atoms will provide dyes having good fastness properties, the required starting materials are either not commercially available or are difficult to prepare and thus are not of present practical value.

Substitution in the benzene nucleus, A, relative to the azo link will typically be in the 2-position, the 3-position, the 4-position, the 2,4-positions, the 2,5-positions, the 2,4,6-positions, the 2,3,4-positions and the 2,4,5-positions. Substitution in the naphthalene nucleus will typically be in the 2-position, the 4-position, the 5-position, the 8-position, the 2,3-positions, the 2,4-positions and the 2,6-positions.

Substitution in the 2-aminopyridine is typically in the 3-; 4-; 5-; 6-; 3,5- and 4,6-positions.

Azo compounds according to the present invention having particular utility in the dyeing of metal-containing, typically nickel-containing, polypropylene textile materials are those of the formula (I) where A is a benzene nucleus optionally substituted with up to three alkyl, alkoxy, halogen, or trifluoromethyl substituents.

Azo compounds of the present invention which are particularly suitable for dyeing aromatic polyester may be represented by the formula:

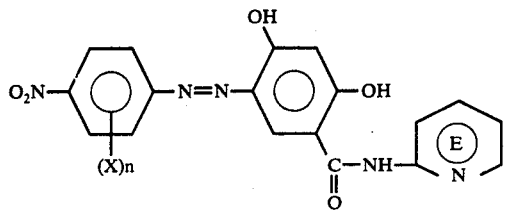

where
n is 0, 1, or 2;
X is selected from methyl, methoxy, ethoxy, nitro, cyano, chlorine, bromine, trifluoromethyl, —COOCH$_3$ and —COOC$_2$H$_5$, and
E is as defined above.

The azo compounds according to the invention are obtained by condensing 2,4-dihydroxybenzoic acid with a 2-aminopyridine in the presence of an acid chloride forming agent in an inert solvent to form a coupler of the formula (II)

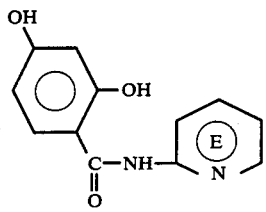

wherein
E is as defined above.

An aromatic amine of the formula A-NH$_2$, where A is as defined above, is diazotized and coupled into the coupler (II). Alternatively, it is possible in some instances to prepare the azo compounds by diazotizing the aromatic amine and coupling it into the 2,4-dihydroxybenzoic acid and thereafter condensing the resultant azo compound with the 2-aminopyridine. (It is to be noted that reference hereinafter to the aromatic amine and the 2-aminopyridine, unless otherwise specified, is intended to include the unsubstituted and substituted compounds as defined above).

The condensation of the 2,4-dihydroxybenzoic acid with the 2-aminopyridine or of the 2-aminopyridine with the 2,4-dihydroxybenzoic acid-azo derivative is typically carried out in an inert solvent such as nitrobenzene, monochlorobenzene, o-dichlorobenzene, toluene or o-chlorotoluene. The 2-aminopyridine and the 2,4-dihydroxybenzoic acid or its azo derivative are stirred in the inert solvent at a temperature of between 25° and 110° C. An acid chloride-forming agent, such as phosphorus trichloride, phosphorus pentachloride, thionyl chloride or sulfuryl chloride, is usually added dropwise and heating is continued until condensation is complete. The amide formed is usually isolated by steam distillation of the inert solvent.

Suitable 2-aminopyridines for preparing the azo compounds (I) include, for example 2-aminopyridine; 2-amino-4-picoline; 2-amino-4-chloropyridine; 2-amino-3-bromo-5-nitropyridine and 2-amino-5-chloropyridine. Choice of the 2-aminopyridines within the definition of E above is believed to be limited only by practical considerations including cost, ease of handling and the like.

As suitable diazotizable aromatic amines, there may be mentioned 4-nitroaniline; 2-nitroaniline; methylanthranilate; orthoanisidine; ethyl-p-aminobenzoate; 2-amino-5-nitrobenzonitrile; p-aminoacetanilide; 3-chloro-o-toluidine; 4-nitro-3-chloro-o-toluidine; p-ethylaniline, p-butylaniline; anthranilonitrile; 2-chloro-5-trifluoromethylaniline; 4-nitro-2-chloroaniline; 4-nitro-2,6-dichloroaniline; 2,4-dimethoxy-5-chloroaniline; 2-, 6-dichloroaniline; 2,4-dimethoxyaniline; 1-naphthylamine; 4-nitro-1-naphthylamine; 2,4-dichloro-1-naphthylamine; 4-methoxy-1-naphthylamine and 5-bromo-1-naphthylamine. Other aromatic amines, of course, may be employed as a starting material to prepare the azo compounds according to the invention. The choice of suitable aromatic amines within the definition of A above is also believed to be limited only by economic considerations and availability.

Diazotization of the aromatic amine and coupling of the diazotized amine into the 2,4-dihydroxybenzoic acid or the coupler (II) are carried out in the usual way. Diazotization of the aromatic amine is effected by heating it (if necessary to achieve solution) in an aqueous solution of strong mineral acid such as hydrochloric acid, cooling the resulting solution to a temperature of 0°–10° C., and adding thereto a quantity of sodium nitrite slightly in excess of the stoichiometric requirement. An alternate method of diazotization involves dissolving sodium nitrite in concentrated sulfuric acid, heating to a temperature of about 60°–70° C., cooling the resulting solution to 0°–10° C. and adding thereto the aromatic amine.

The coupling reaction is carried out by adding the diazonium salt to a cold aqueous alkaline solution of the respective coupler. The mixture is allowed to react until the coupling is essentially complete, usually in 1–24 hours at 0° C. to room temperature and is thereafter filtered and washed with water or water containing dissolved sodium chloride. The product may be reslurried in water which is then made acidic to Congo Red paper with hydrochloric or other acid. The mixture is filtered and the cake is washed neutral with water. The desired azo product is thus obtained in the form of a moist cake. The product may be used in this form or it may be dried before grinding with a suitable agent to form a disperse paste or powder as described below.

The prepare the azo compound for application to the synthetic fiber substrates noted hereabove, it must be suitably dispersed. This may be done by any of the several well-known methods, e.g., milling as in a ball-mill with dispersing agents such as lignin sulfonic acid materials. The resultant aqueous dispersion can be dried, as in a spray-dryer, or preserved and used as a paste. Standardization to any desired lower strength can be done with inert colorless diluents such as water soluble inorganic salts, soluble organic materials or additional dispersants for powders, or water for pastes. Other materials such as preservatives, foam-control agents, and wetting agents (for powders) may be added as desired.

Dispersed pastes are made by wet milling the azo materials in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates, e.g., the condensation products of sulfonated naphthalene and formaldehyde, such as sodium dinaphthylmethanedisulfonate, are conveniently used. The disperse paste may be cut or standardized to a standard strength with water. The final color content of the finished paste is usually from 5 to 40% by weight (pure color) active dye base.

Disperse powders are prepared by wet milling color in the presence of a dispersant, such a those mentioned hereabove, in equipment such as a ball-mill, Werner-Pfleiderer mill or attritor. The dispersed material is oven or spray dried and micropulverized if necessary to provide the dispersed powder. The color is cut or standardized to a standard strength in a blender with a diluent, such as the same or another dispersant or dextrin. A wetting agent, such as sodium cetyl sulfate or an alkylphenoxy polyethanol may be added to aid in wetting out the product when it is placed in the dye bath. Disperse powders are usually cut or standardized to 10-50 percent by weight color content (pure color).

The dye, when added to water with or without auxiliary agents, forms a near colloidal aqueous dispersion from which aromatic polyester fiber or textile material or metallized, i.e., metal-containing, polypropylene textile material is dyed in the conventional manner at 40°-105° C (104°-220° F) to give a colored fiber containing about 0.01-2 percent by weight dye (100% color basis). Alternatively, dyeing on polyester may be accomplished without a carrier at temperatures of 100°-150° C under pressure.

The dye may also be applied in patterns by conventional printing methods. The printing paste can be thickened with customary thickening agents and may also contain other additives conventionally used with printing pastes. The printing paste is expediently applied to the fabric by a printing block or a roller, whereupon the printed fabric is dried and steamed at a temperature between 105° C and 110° C. After the dyeing or printing of the fiber, it is treated with a hot aqueous soap solution, rinsed thoroughly and dried. As suitable dyeing and printing techniques there may be mentioned those described in U.S. Pat. Nos. 3,399,027; 3,399,952; 3,492,078; 3,556,709; and 3,360,656.

The dye can also be applied to aromatic polyester fiber by thermofixation methods, such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180°-220° C (356° ∝ 428° F) are used for 30 to 90 seconds. If the fabric contains cotton or viscose rayon, apart from synthetic fibers, there is little danger of damaging cellulosic portions, but if wool is present, the temperature must be kept within 180°-200° C and the time must be reduced to 30 seconds.

In addition to providing dyeings on aromatic polyester of excellent dyeing and fastness properties, the dyes (I) also dye metal-containing, and particularly, nickel-containing, polypropylene in strong bright shades which are fast to light, dry cleaning, crocking and heat.

The metal-containing polypropylene may be any of the conventionally produced polypropylene materials generally designated in the textile art as "polypropylene fibers" and which contain Werner complex-forming metal such as aluminum, chromium, cobalt, nickel or zinc either as such or in the form of its salts or chelates. The exact metal content of these fibers is not generally specified by the manufacturer but is believed to vary within the range of about 0.1 to about 2.0 weight percent. The metal improves the dyeing properties of the fiber materials and also serves to stabilize the materials against degradation due to light and heat. Nickel-containing polypropylene materials are available commercially, for example, under the trademark "HERCULON."

In order to evaluate the effectiveness of a particular dye for a given type of fiber, the dyed fiber is examined for various properties including, for example, substantivity, light fastness, resistance of the color to sublimation, crocking, heat, and resistance to dry cleaning solvents. Specific tests for the evaluation of these important properties are described in the examples that follow.

EXAMPLE I

Preparation of the Coupler

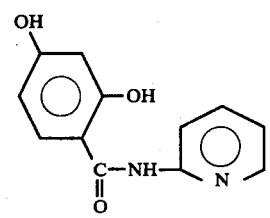

(M.W. 230)

A mixture of 154 g. 2,4-dihydroxybenzoic acid in 500 g. nitrobenzene was stirred at room temperature to a fine slurry. Then there was added in small portions 94 g. 2-aminopyridine. The mass was heated to 75° C, then there was added dropwise during 3 hours at 75°-80° C 68.8 g. phosphorus trichloride. After addition was completed, 3 g. Tween 20 were added and heating was continued at 75°-80° C for 4-5 hours. The reaction mixture was cooled to room temperature. Then there was added dropwise 500 ml. water. Stirring was continued until a fine crystalline material was formed. The product was filtered and was washed acid free with hot water. The cake was then steam distilled to remove nitrobenzene.

Yield: 202.8 g.

Theory: 230 g. (88.2%)

EXAMPLE II

Preparation of the Azo Compound

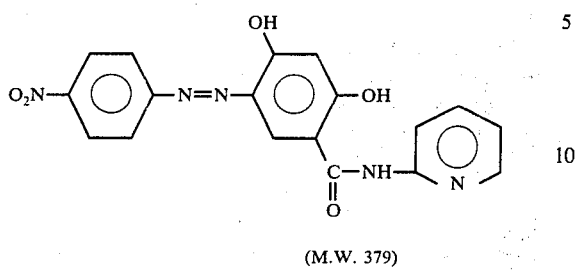

(M.W. 379)

A mixture of 20.7 g. p-nitroaniline in 60 g. 32% hydrochloric acid and 60 ml. water was heated at 70° C to complete solution. The clear solution was drowned into an ice-water mixture and was diazotized below 5° C with 10.5 g. sodium nitrite dissolved in 50 ml. water. The clear diazo solution was added during one hour at 0° C to a solution of 34.5 g. N-2-pyridine-2,4-dihydroxybenzamide obtained in Example I in 500 ml. water, 12 g. sodium hydroxide flakes and 42 g. soda ash. After coupling was complete, enough sodium chloride was added to make a 15% salt solution. The mixture was filtered and the cake was reslurried without washing, into 2000 ml. water and was made acidic to Congo Red paper with 32% hydrochloric acid. The mass was filtered and the cake was washed neutral with water.

Yield: 56.2 g.

Theory: 56.8 g. (100%)

40 g. of the product of this example was charged to a sandmill with 60 g. Lignosol FTA (a commercially available ligninsulfonic acid dispersant) and 300 ml. water. The mixture was sandmilled until dispersion test was satisfactory.

Yield: 400 g. 10% Color Content Paste

EXAMPLE III

An aqueous dye bath containing 10% Marcron (a commercially available phenolic dye carrier) and 1% monosodium phosphate as a buffering agent was prepared. Type 54, Style 755, Dacron polyester fabric was treated in a bath at 120° F for 10 minutes, the fabric to water dye bath ratio being 1:40. A disperse paste of the dye of Example II was added in an amount sufficient to provide a bath containing 0.4 percent dye based on the weight of polyester fiber. Dyeing was continued for one hour at 205° F and the fabric was removed from the bath, rinsed and dried. Sample dyeings were tested for sublimation according to standard AATCC Color Fastness to Dry Heat (Sublimation) Test No. 117-1974T, page 119 of the 1974 Technical Manual of the American Association of Textile Chemists and Colorists (AATCC). The dyed fabric was placed between a sandwich of undyed Dacron polyester fabric and heat was applied for 30 seconds. Sublimation tests were made at 350° C and 400° F on goods as described above. A sublimation rating of (−5) was established, indicating outstanding resistance to sublimation. The dyeing was characterised by a brilliant yellowish orange hue with excellent retention of shade and brightness when viewed in various types of light. Similar excellent results were obtained when the dye was applied to the fabric by the Thermosol process and then tested for sublimation as described above. The dyeings were also tested for light fastness by subjecting them to carbon arc fading in accordance with AATCC Color Fastness to Light Carbon Arc Lamp, Continuous Light Test No. 16A-1974, page 124, 1974 Technical Manual of the AATCC. The dyeings showed only a very slight break at 20 hours exposure indicating very good fastness to light.

EXAMPLE IV

Preparation of the Azo Compound

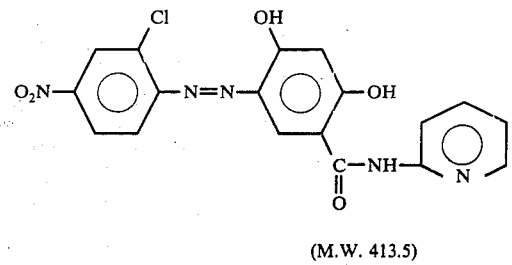

(M.W. 413.5)

A mixture of 17.3 g. o-chloro-p-nitroaniline, 40 g. 32% hydrochloric acid, 40 ml. water and 1.0 g. Tween 20 was heated to a smooth slurry at 70° C. The mixture was drowned hot into 400 g. ice-water and was diazotized with a solution of 7.2 g. sodium nitrite in 50 ml. water. After stirring one and one half hour at 0°-5° C, excess nitrous acid was destroyed with sulfamic acid and the diazo solution was clarified. The clear diazo solution was coupled with N-2-pyridine-2,4-dihydroxybenzamide as prepared in Example I. The above product was obtained quantitatively. The dispersed product dyed polyester fibers in strong bright orange shades having outstanding sublimation and very good light fastness.

EXAMPLE V

Preparation of the Azo Compound

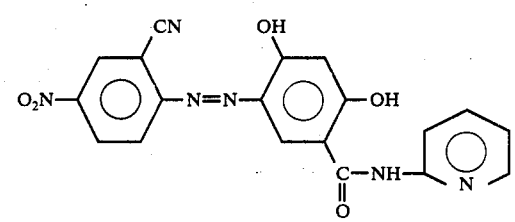

(M.W. 404)

Sixteen and eight-tenths grams of 2-amino-5-nitrobenzonitrile was added at 0° C to 100 g. nitrosyl sulfuric acid which contained 7.2 g. sodium nitrite. The mixture was stirred two hours at 0°-5° C. The diazo mass was then added carefully during 2 hours at 0° C to a solution of 23 g. N-2-pyridine-2,4-dihydroxybenzamide (prepared as in Example II) in 500 ml. water, 8 g. sodium hydroxide flakes and 150 g. soda ash. After coupling was complete, the reaction mixture was filtered and the cake was reslurried, without washing, into 2000 ml. water and was made acidic to Congo Red paper with 32% hydrochloric acid. The mass was filtered and the cake was washed neutral with water. The above product was obtained in 72% of the theoretical yield. When applied to polyester fibers as a dispersed dye, the compound produced bright orange shades having excellent general fastness properties, especially to sublimation.

EXAMPLE VI

Preparation of the Azo Compound

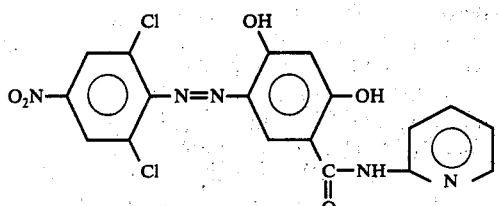

(M.W. 448)

By proceeding as described in Example V, but substituting an equimolecular proportion of 2,6-dichloro-4-nitroaniline for 2-amino-5-nitrobenzonitrile, the above product was obtained in 85% of the theoretical yield. When dispersed, the product dyed polyester fibers in bright yellowish orange shades of good light fastness and outstanding sublimation.

EXAMPLE VII

Preparation of the Azo Compound

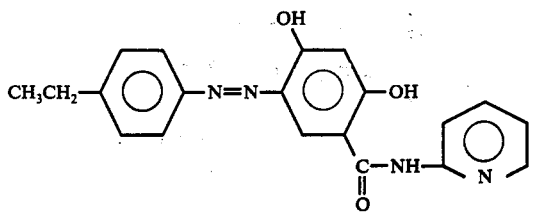

(M.W. 362)

A mixture of 12.1 g. p-ethylaniline, 30 g. 32% hydrochloric acid and 500 ml. water was stirred to complete solution. Ice was added and the mixture was diazotized at 0° C with a solution of 7.2 g. sodium nitrite in 50 ml. water. After stirring at 0° C for one half hour, excess nitrous acid was destroyed. The clear diazo solution was added during one hour at 0° C to a solution of 23 g. N-2-pyridine-2,4-dihydroxybenzamide in 500 ml. water, 8 g. sodium hydroxide flakes and 16 g. soda ash. After coupling was complete, enough sodium chloride was added to make a 10% salt solution. The mixture was filtered and the cake was reslurried, without washing, into 2000 ml. water and was made acidic to Congo Red paper with 32% hydrochloric acid. The mass was filtered and the cake was washed neutral with water.

Yield: 36 g.

Theory: 36.2 g. (100%)

A mixture of 35 g. of the above product and 50 g. Lignosol FTA in 265 ml. water was ball milled until dispersion test was satisfactory.

Yield: 350 g. 10% Color Content Paste

The azo dye when applied to aromatic polyester fabric produced bright yellowish orange shades of excellent light fastness (no break after 20 hours) and near perfect sublimation.

EXAMPLE VIII

Printing of Nickel-containing Polypropylene

A printing paste was prepared with 1000 parts of Tragacanth Gum thickener (polysaccharides of galactose, fructose, xylose and arabinose with glucuronic acid), 5 parts acetic acid and a quantity of dispersed dyestuff corresponding to 5 to 10 parts of a pure dyestuff obtained in Example VII. A fabric made of fibers of polypropylene containing nickel was printed on a roller. The fabric was dried and steamed for 8 minutes at 105°-110° C. The fabric was vigorously washed in a bath of soap at 90° C. A brilliant golden yellow shade was obtained which possessed outstanding fastness to light and crocking and remarkable resistance to the chlorinated solvents used in dry cleaning.

EXAMPLE IX

Preparation of the Azo Compound

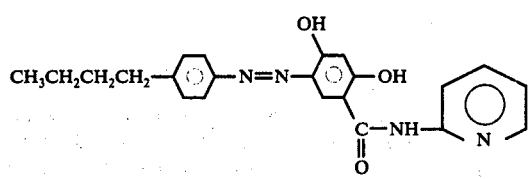

(M.W. 390)

In a substantially identical manner to that described in Example VII, an equivalent quantity of p-n-butylaniline was used instead of p-ethylaniline. The above product was obtained in 73% yield. A 10% color content paste was made as described in Example VII.

EXAMPLE X

Piece goods of Herculon isotactic polypropylene containing a bis(p-alkylphenol)monosulfide nickel compound were placed in a bath set at 35° C containing 1% Triton X-100 (iso-octyl-phenyl polyethoxy ethanol) based on weight of fiber, 1-1.5% acetic acid (pH 3-4) and a 1% (on weight of fiber) dispersion of the dye from Example IX. After 5 minutes the temperature was raised to 95° C over a 30 minute period. The dyeing was continued at 95° C for an additional 45 minutes. The piece goods were removed from the dye bath, rinsed and soaped in 0.5% soap solution at 90° C for 10 minutes. The dyed fabrics were rinsed with water and dried. They were colored a deep brilliant greenish yellow shade of outstanding light fastness and remarkable resistance to crocking and dry cleaning solvents.

EXAMPLE XI

Preparation of the Azo Compound

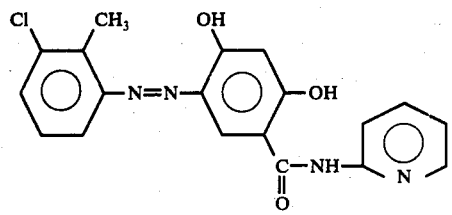

(M.W. 282.5)

If instead of the p-ethylaniline in Example VII, an equivalent amount of 2-methyl-3-chloroaniline was used, the above product was obtained in 88% yield. The dispersed product, when printed on nickel-containing polypropylene in accordance with the procedure described in Example VIII produced strong reddish yellow shades having very good general fastness properties. The dispersed product also dyed polyester fibers in yellowish orange shades having excellent sublimation fastness.

EXAMPLE XII

Preparation of the Azo Compound

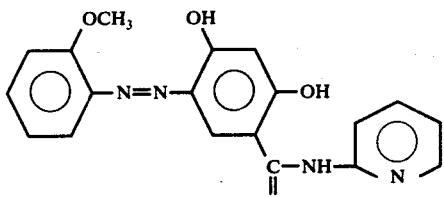

(M.W. 364)

By proceeding as described in Example VII, but substituting an equimolecular proportion of o-anisidine for the p-ethylaniline, the above product was obtained in 85% yield. The dispersed product dyed polyester fibers in orange shades having excellent buildup and outstanding sublimation. The dispersed product also dyed nickel-containing polypropylene fibers in golden yellow shades of excellent strength and outstanding resistance to crocking and dry cleaning solvents.

EXAMPLE XIII

Preparation of the Azo Compound

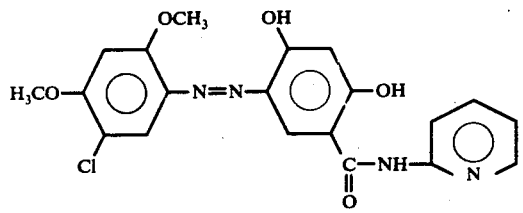

(M.W. 428.5)

If instead of the p-ethylaniline in Example VII, an equivalent amount of 5-chloro-2,4-dimethoxyaniline was used, the above product was obtained in 82% of the theoretical yield. The dispersed product, when printed on nickel-containing polypropylene in accordance with the procedure described in Example VIII, produced yellowish brown shades having excellent strength and outstanding resistance to crocking and dry cleaning solvents.

EXAMPLE XIV

Preparation of the Azo Compound

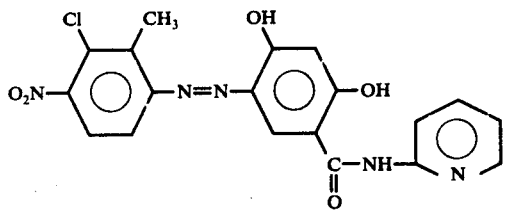

(M.W. 469.5)

A mixture of 18.4 g. 4-nitro-3-chloro-o-toluidine and 100 g. 66 Be sulfuric acid was stirred to complete solution. The clear solution was drowned into 500 g. ice, 500 ml. water, 3 g. Tween 20 and 25 g. 32% hydrochloric acid. The mixture was diazotized with a solution of 7 g. sodium nitrite in 50 ml. water. The diazo mixture was stirred at 0°–5° C. for 2 hours. Excess nitrous acid was destroyed with sulfamic acid and the diazo mass was clarified. The clear diazo solution was added during two hours at 0° C. to a solution of 23 g. N-2-pyridine-2,4-dihydroxybenzamide in 500 ml. water, 8 g. sodium hydroxide flakes and 130 g. soda ash. Coupling was very rapid. The reaction mixture was filtered and the cake was reslurried, without washing, into 2000 ml. water and was made acidic to Congo Red paper with 32% hydrochloric acid. The mass was filtered and the cake was washed neutral with water.

Yield: 43.2 g.
Theory: 46.9 g. (92%)

The dispersed product dyed polyester fibers in bright yellowish orange shades having excellent strength and build-up, and outstanding sublimation fastness.

EXAMPLE XV

Preparation of the Azo Compound

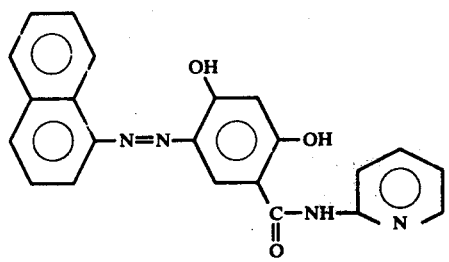

(M.W. 384)

A mixture of 32.2 g. 1-naphthylamine in 80 g. 32% hydrochloric acid and 400 ml. water was heated to a complete solution. The clear solution was iced to 0° C and was diazotized with a solution of 15.8 g. sodium nitrite in 100 ml. water. After stirring 30 minutes at 0° C, excess nitrous acid was destroyed with sulfamic acid and the diazo solution was clarified. The clear diazo solution was then coupled with N-2-pyridine 2,4-dihydroxybenzamide as described in Example VII. The above product was obtained in 87% of the theoretical yield. When dispersed and applied to nickel-containing polypropylene fabric, the dye produced strong orange shades having very good light fastness and excellent resistance to crocking and dry cleaning solvents.

EXAMPLE XVI – XXXIX

Following the procedure outlined in the foregoing examples, azo compounds are prepared as shown in Table I read in conjunction with the following general formula:

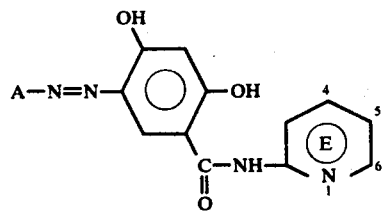

Polyester and/or nickel-containing polypropylene are dyed with each compound to produce dyeings having good fastness properties and having the shades indicated in the table.

TABLE I

| No. | A (1-position attached to azo link) | Substituents on Ring E | Shade on Ni-containing Polypropylene | Shade on Polyester |
|---|---|---|---|---|
| XVI | 4-nitronaphthyl | — | Reddish Brown | Brown |
| XVII | 4-carbethoxyphenyl | 4-Cl | Golden Yellow | Yellowish Orange |
| XVIII | 4-nitro-2-cyanophenyl | 4,6-di-Cl | Reddish Yellow | Bright Orange |
| XIX | 2,4-dichloronaphthyl | — | Burnt Orange | Yellowish Brown |
| XX | o-methoxyphenyl | 5-OC$_2$H$_5$ | Golden Yellow | Yellowish Orange |
| XXI | 4-nitro-2,6-dichlorophenyl | 6-Br | Orange | Yellowish Brown |
| XXII | 2,5-dichlorophenyl | 5-Cl | Yellow | Yellowish Orange |
| XXIII | 5-bromonaphthyl | — | Burnt Orange | Yellowish Brown |
| XXIV | 4-methoxynaphthyl | — | Burnt Orange | Yellowish Brown |
| XXV | 4-nitronaphthyl | 6-OC$_2$H$_5$ | Brown | Brown |
| XXVI | 5,7-dichloronaphthyl | — | Burnt Orange | Yellowish Brown |
| XXVII | 4-nitrophenyl | 3-Br, 5-NO$_2$ | Reddish Yellow | Orange |
| XXVIII | 2-carbmethoxyphenyl | 5-CH$_3$ | Golden Yellow | Yellowish Orange |
| XXIX | 3-chloro-2-methylphenyl | 3-C$_2$H$_5$ | Golden Yellow | Yellowish Orange |
| XXX | 4-nitro-3-chloro-2-methylphenyl | 6-Br | Yellowish Orange | Yellowish Brown |
| XXXI | 2-chloro-4-nitrophenyl | 3,5-di-Br | Reddish Yellow | Bright Orange |
| XXXII | 4-n-butylphenyl | 3-C$_2$H$_5$ | Golden Yellow | Weak Yellowish Orange |
| XXXIII | 2,4-dimethoxyphenyl | 4-Cl | Reddish Yellow | Orange |
| XXXIV | 4-nitronaphthyl | 3-Br, 5-NO$_2$ | Reddish Brown | Reddish Brown |
| XXXV | 5-bromonaphthyl | 3-CH$_3$ | Burnt Orange | Yellowish Brown |
| XXXVI | 2,4-dichloronaphthyl | 6-Br | Burnt Orange | Yellowish Brown |
| XXXVII | 4-ethylphenyl | 4-isoBu | Bright Golden Yellow | Weak Orange |
| XXXVIII | 2-carboxyphenyl | — | No Color Value | Orange |
| XXXIX | 4-nitro-2-hydroxyphenyl | — | No Color Value | Khaki |

Although the invention has been described in conjunction with the foregoing examples, it is not to be limited thereto, but instead includes all those embodiments within the scope and spirit of the appended claims.

What is claimed is:

1. An azo compound of the formula:

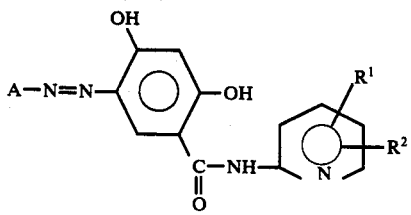

wherein
A is phenyl, phenyl substituted by up to three substituents, naphthyl or naphthyl substituted by up to two substituents, the substituents being independently selected from the group consisting of alkyl of 1–4 carbon atoms; alkoxy of 1–4 carbon atoms; nitro; cyano; fluoro; chloro; bromo; trifluoromethyl; hydroxy; RCOO—, where R is alkyl of 1–4 carbon atoms; carboxy; ROOC—, where R is alkyl of 1–4 carbon atoms; RCO—, where R is alkyl of 1–4 carbon atoms; benzoyl; RCONH—, where R is alkyl of 1–4 carbon atoms; ArCONH—, where Ar is phenyl; and carbamyl, the nitrogen of which is unsubstituted or singly or doubly substituted with alkyl of 1–4 carbon atoms; and R$^1$ and R$^2$ are independently selected from the group consisting of hydrogen; alkyl of 1–4 carbon atoms; alkoxy of 1–4 carbon atoms; nitro; chloro and bromo.

2. The azo compound of claim 1 of the formula:

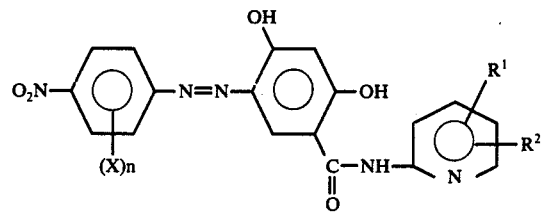

wherein
n is 0, 1 or 2;
X is independently selected from methyl, methoxy, ethoxy, nitro, cyano, chloro, bromo, trifluoromethyl, —COOCH$_3$ and —COOC$_2$H$_5$; and
R$^1$ and R$^2$ are as defined in claim 1.

3. The azo compound of claim 1 wherein A is phenyl or phenyl substituted by up to three substituents independently selected from the group consisting of alkyl, alkoxy, chloro, bromo, and trifluoromethyl.

4. The azo compound of claim 1,

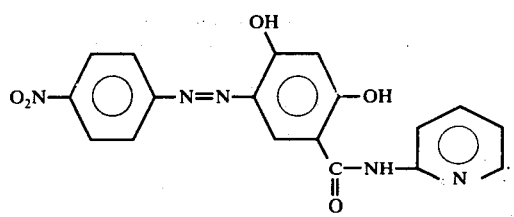
5. The azo compound of claim 1,
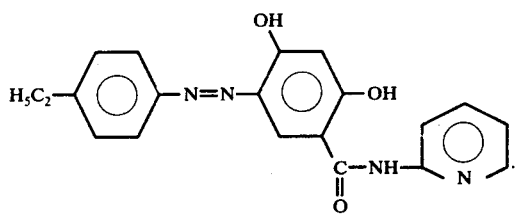
6. The azo compound of claim 1,
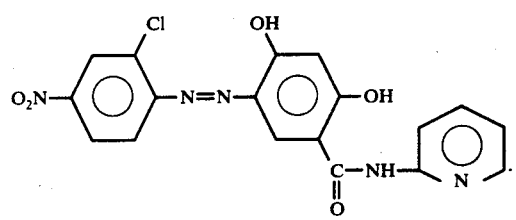
7. The azo compound of claim 1,
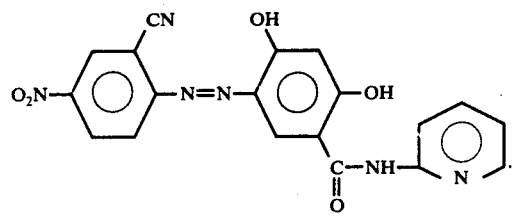
8. The azo compound of claim 1,
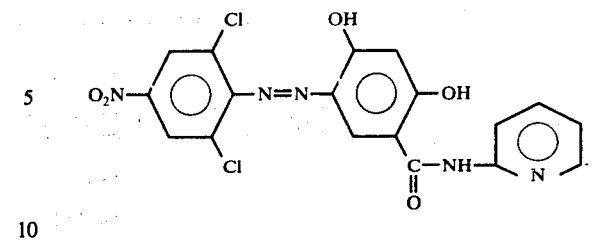
9. The azo compound of claim 1,
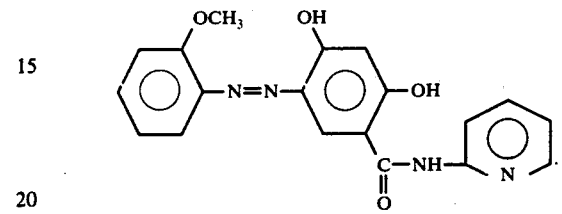
10. The azo compound of claim 1,
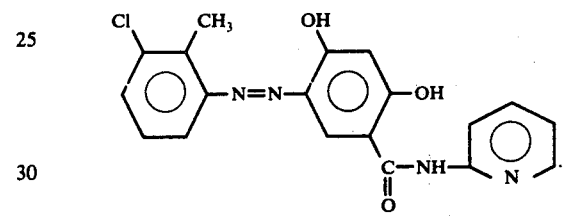
11. The azo compound of claim 1,
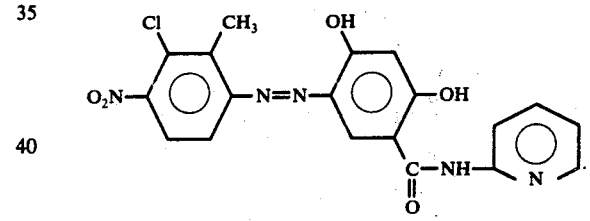
* * * * *